United States Patent
Reddy et al.

(10) Patent No.: US 9,766,983 B2
(45) Date of Patent: *Sep. 19, 2017

(54) PROXIMITY AND IN-MEMORY MAP BASED SIGNATURE SEARCHING FOR DUPLICATE DATA

(75) Inventors: Chandra Reddy, South Setauket, NY (US); Prashant Parikh, Holtsville, NY (US); Liqiu Song, Beijing (CN)

(73) Assignee: CA, Inc., Islandia, NY (US)

( * ) Notice: Subject to any disclaimer, the term of this patent is extended or adjusted under 35 U.S.C. 154(b) by 1248 days.

This patent is subject to a terminal disclaimer.

(21) Appl. No.: 12/130,514

(22) Filed: May 30, 2008

(65) Prior Publication Data
US 2009/0228484 A1 Sep. 10, 2009

Related U.S. Application Data

(60) Provisional application No. 61/033,920, filed on Mar. 5, 2008.

(51) Int. Cl.
*G06F 17/00* (2006.01)
*G06F 11/14* (2006.01)
*G06F 17/30* (2006.01)

(52) U.S. Cl.
CPC .... *G06F 11/1453* (2013.01); *G06F 17/30153* (2013.01)

(58) Field of Classification Search
CPC ........... G06F 17/30159; G06F 11/1453; G06F 11/1451; G06F 11/30153
See application file for complete search history.

(56) References Cited

U.S. PATENT DOCUMENTS

| 4,876,541 | A | 10/1989 | Storer |
| 5,414,650 | A | 5/1995 | Hekhuis |
| 5,778,395 | A | 7/1998 | Whiting et al. |
| 6,615,225 | B1 | 9/2003 | Cannon et al. |
| 6,704,730 | B2 | 3/2004 | Moulton et al. |
| 6,785,786 | B1 | 8/2004 | Gold et al. |
| 6,799,206 | B1 | 9/2004 | Workman et al. |
| 6,967,802 | B1 * | 11/2005 | Bailey .......................... 360/72.1 |
| 7,257,257 | B2 | 8/2007 | Anderson et al. |
| 7,761,425 | B1 * | 7/2010 | Erickson et al. ............. 707/649 |
| 7,797,279 | B1 * | 9/2010 | Starling .............. G06F 11/1451 707/641 |
| 8,082,231 | B1 * | 12/2011 | McDaniel ........... G06F 11/1453 707/681 |
| 8,099,605 | B1 * | 1/2012 | Billsrom et al. .............. 713/187 |
| 8,176,015 | B1 * | 5/2012 | Somerville ....... G06F 17/30159 707/661 |

(Continued)

OTHER PUBLICATIONS

"U.S. Appl. No. 12/130,517, Final Office Action mailed Mar. 1, 2011", 11 pgs.

(Continued)

*Primary Examiner* — Tarek Chbouki
(74) *Attorney, Agent, or Firm* — Gilliam IP PLLC

(57) ABSTRACT

A computer implemented method and system obtains current signatures of data chunks and performs a proximity search of a library of previous signatures as a function of the likely location of corresponding data chunks. A full search of the library of previous signatures for those current signatures not found in the proximity search is also performed.

20 Claims, 9 Drawing Sheets

(56) References Cited

U.S. PATENT DOCUMENTS

| | | | |
|---|---|---|---|
| 2002/0169877 A1* | 11/2002 | Bantz | H04L 63/0428 709/226 |
| 2004/0236803 A1 | 11/2004 | Spiegeleer | |
| 2005/0114614 A1 | 5/2005 | Anderson et al. | |
| 2005/0177725 A1 | 8/2005 | Lowe et al. | |
| 2005/0283500 A1 | 12/2005 | Eshghi et al. | |
| 2006/0059207 A1* | 3/2006 | Hirsch et al. | 707/201 |
| 2006/0085561 A1 | 4/2006 | Manasse et al. | |
| 2006/0123250 A1* | 6/2006 | Maheshwari | G06F 17/30943 713/193 |
| 2006/0167960 A1* | 7/2006 | Lomet | G06F 17/30353 |
| 2006/0184652 A1 | 8/2006 | Teodosiu et al. | |
| 2006/0271530 A1* | 11/2006 | Bauer | 707/5 |
| 2007/0022144 A1 | 1/2007 | Chen | |
| 2007/0088973 A1* | 4/2007 | Passerini et al. | 714/5 |
| 2007/0266062 A1 | 11/2007 | Young | |
| 2007/0288533 A1* | 12/2007 | Srivastava et al. | 707/203 |
| 2008/0109448 A1 | 5/2008 | Aboel-Nil et al. | |
| 2008/0243953 A1 | 10/2008 | Wu et al. | |
| 2009/0172047 A1* | 7/2009 | Boyko | G06F 17/30563 |
| 2009/0177721 A1 | 7/2009 | Mimatsu | |
| 2009/0228522 A1 | 9/2009 | Reddy et al. | |
| 2009/0228533 A1 | 9/2009 | Reddy | |
| 2009/0228680 A1 | 9/2009 | Reddy et al. | |
| 2010/0115003 A1 | 5/2010 | Soules et al. | |

OTHER PUBLICATIONS

"U.S. Appl. No. 12/130,517, Non Final Office Action mailed Nov. 9, 2011", 10 pgs.

"U.S. Appl. No. 12/130,517, Non-Final Office Action mailed Oct. 1, 2010", 12 pgs.

"U.S. Appl. No. 12/130,517, Preliminary Amendment filed May 30, 2008", 3 pgs.

"U.S. Appl. No. 12/130,517, Response filed Jan. 3, 2011 to Non Final Office Action mailed Oct. 1, 2010", 8 pgs.

"U.S. Appl. No. 12/130,517, Response filed Jun. 1, 2011 to Final Office Action mailed Mar. 1, 2011", 7 pgs.

"U.S. Appl. No. 12/130,548, Final Office Action mailed Feb. 1, 2011", 11 pgs.

"U.S. Appl. No. 12/130,548, Non Final Office Action mailed Jul. 20, 2011", 11 pgs.

"U.S. Appl. No. 12/130,548, Non-Final Office Action mailed Sep. 14, 2010", 9 pgs.

"U.S. Appl. No. 12/130,548, Preliminary Amendment filed May 30, 2008", 3 pgs.

"U.S. Appl. No. 12/130,548, Response filed Apr. 26, 2011 to Final Office Action mailed Feb. 1, 2011", 8 pgs.

"U.S. Appl. No. 12/130,548, Response filed Oct. 20, 2011 to Non Final Office Action mailed Jul. 20, 2011", 11 pgs.

"U.S. Appl. No. 12/130,548, Response filed Dec. 14, 2010 to Non Final Office Action mailed Sep. 14, 2010", 7 pgs.

"U.S. Appl. No. 12/130,637, Non Final Office Action mailed Jul. 8, 2011", 7 pgs.

"U.S. Appl. No. 12/130,637, Notice of Allowance mailed Sep. 7, 2011", 9 pgs.

"U.S. Appl. No. 12/130,637, Response filed Aug. 11, 2011 to Non Final Office Action mailed Jul. 8, 2011", 10 pgs.

"U.S. Appl. No. 12/130,517 , Response filed Feb. 9, 2012 to Non Final Office Action mailed Nov. 9, 2011", 9 pgs.

"U.S. Appl. No. 12/130,548, Final Office Action mailed Feb. 9, 2012", 11 pgs.

"U.S. Appl. No. 12/130,637, Notice of Allowance mailed Nov. 28, 2011", 9 pgs.

* cited by examiner

US 9,766,983 B2

PROXIMITY AND IN-MEMORY MAP BASED SIGNATURE SEARCHING FOR DUPLICATE DATA

RELATED APPLICATIONS

This is a United States Patent Application that claims priority under 35 U.S.C. §119(e) to United States Provisional Patent Application titled "SYSTEM AND METHOD OF SEARCHING FOR DUPLICATE DATA," (Ser. No. 61/033,920) filed on Mar. 5, 2008 which is incorporated by reference in its entirety herein.

BACKGROUND

Data is very important to individuals and businesses. Many businesses regularly back up data stored on computer systems to avoid loss of data should a storage device or system fail or become damaged. One current data backup trend is to backup data to disks and use tapes for long term retention only. The amount of disk space needed to store a month's backup can be very large, such as around 70 terabytes in some examples. The amount of data will likely only be increasing going forward.

One strategy for backing up data involves trying to back up data that has changed, as opposed to all of the data, and then using prior backups of unchanged data to reconstruct the backed up data if needed. In one approach, data may be divided into fixed size blocks. An MD5 hash or a SHA256 hash may be calculated on the data belonging to the fixed size block of data, resulting in an MD5 signature for each block of data. The MD5 signature may be searched against an in memory database or an embedded database of previous MD5 signatures.

The next time the file is backed up, signatures are generated for the blocks and searched against the database of signatures to find duplicates if any data has changed. Since the data being backed up may be very large, there can be a large number of signatures.

SUMMARY

A computer implemented method obtains current signatures of data chunks and performs a proximity search of a library of previous signatures as a function of the likely location of corresponding data chunks. If a signature is found, the corresponding data chunk is identified as not requiring backup.

In a further embodiment, a computer implemented method obtains current signatures of data chunks in a desired block of data from a system domain having multiple blocks. Such current signatures are compared to previous signatures in the library corresponding to the same block of data to perform a proximity search. A subset of library signatures is loaded from a backup domain and a btree of such signatures is created. If a signature was not found in during the proximity search, it may be searched against the btree to determine whether or not a backup of the corresponding data chunk is desired.

A computer readable media has instructions for causing a computer to execute a method that obtains current signatures of data chunks and performs a proximity search of a library of previous signatures as a function of the likely location of corresponding data chunks. If a signature is found, the corresponding data chunk is identified as not requiring backup.

In yet a further embodiment, a system has a signature generator that generates current signatures of data chunks. A search engine performs a proximity search of a library of previous signatures as a function of the likely location of corresponding data chunks. The search engine further performs a search of the library of previous signatures for those current signatures not found in the proximity search.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software or a combination of software and human implemented procedures in one embodiment. The software may consist of computer executable instructions stored on computer readable media such as memory or other type of storage devices. The term "computer readable media" is also used to represent any means by which the computer readable instructions may be received by the computer, such as by different forms of wired or wireless transmissions. Further, such functions correspond to modules, which are software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system.

To facilitate backing up large amounts of data, the data may be divided into chunks, and a signature generated for each chunk. The signature may be a hash over the chunk, and may also include other information, such as a length of the chunk in the case of variable size chunks, or further hashes over subsets of the data. When backing up data that has already been backed up, the signatures for the chunks of data are found and searched against a library of signatures corresponding to the previously backed up data. If a match is found it is determined that the corresponding chunk of data is duplicate to one already existing in a previous backup and need not be stored.

Since the library of signatures can be quite large for large data stores, there is a need to optimize the method used to identify the duplicate chunks of data. The search could be time consuming as there could be more than $10^9$ signatures (for a 16 TB backup data) in an enterprise. Optimization utilizes an assumption that most of the changes to data are localized. If there are two backups of the same data where some of the data has been changed, then most of the duplicates will be near to the original data.

Figure 1:
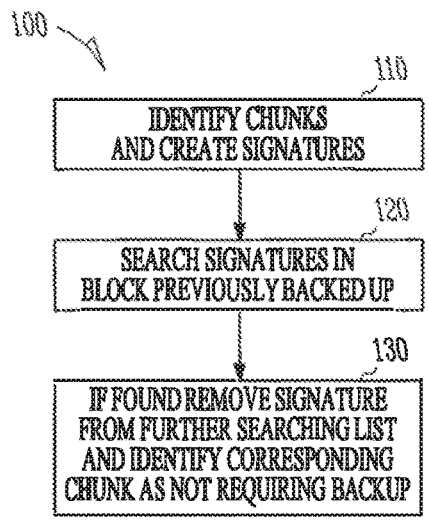
FIG. 1 is a flow chart illustrating a computer implemented method of quickly searching for signatures for backing up data according to an example embodiment.

As a first pass as illustrated at 100 in FIG. 1, a likely proximity search in the last backup of the same data is performed. For example, if the previous full backup of machine A volume C created signatures S1 . . . Sn, old signatures, then for a current backup of Machine A volume C, the chunks of data are identified and new signatures are created at 110. The amount of data in Machine A volume C may be referred to as a block of data. Different size blocks may be used, and different methods of determining physical or logical boundaries may also be used for determining the blocks. Then, a search 120 for the signature match is performed in S1 . . . Sn. Such a search is narrow and fast. It may be performed as each new signature is created, or on multiple new signatures in various embodiments. Further, the search may utilize less memory and CPU resources because the blocks are more likely to contain the same chunks of data, many of which may not have changed. Stated another way, signatures are searched as a function of the corresponding likely location or proximity of the corresponding blocks in a previous backup. If a signature is found at 130, it is removed from the current list of signatures such that the corresponding data chunk does not need to be backed up.

Figure 2:
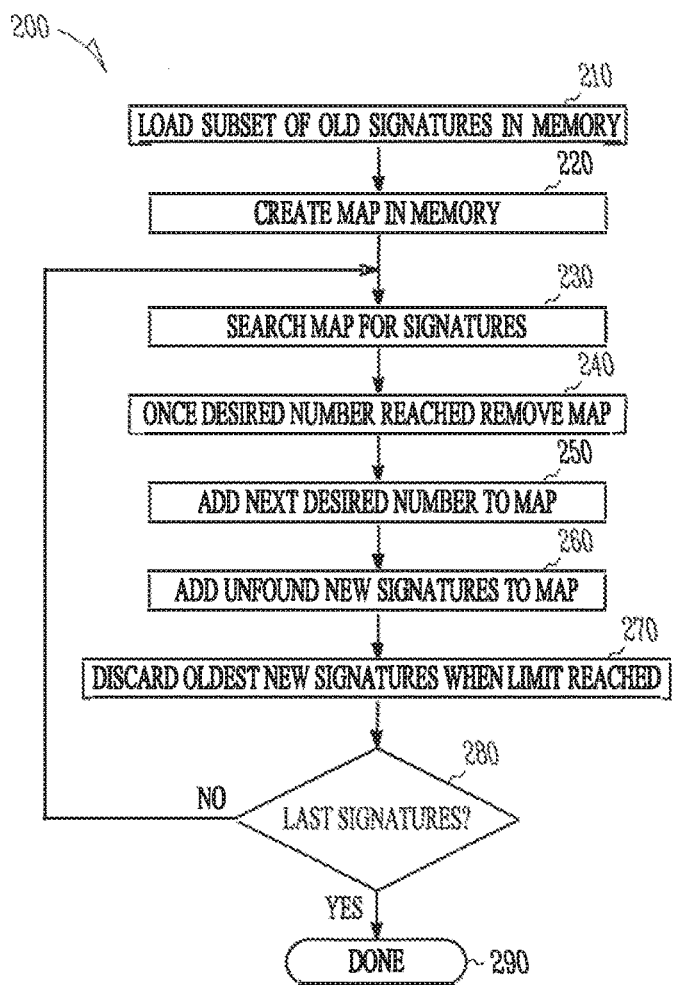
FIG. 2 is a flow chart illustrating a computer implemented method of extensively searching for signatures for backing up data according to an example embodiment.

For a second pass illustrated at 200 in FIG. 2, which may be offline, a comprehensive search is performed against all possible old signatures in a backup domain. Duplicate signatures are removed. For searching of a signature within S1 . . . Sn, the search may be conducted against subsets of signatures. In one embodiment, a subset of for example, $10^6$ signatures are first loaded in memory at 210 from S1 . . . Sn. A map (btree) is created at 220. These signatures come from the hashes which were stored for the previous backup. For the current backup signatures for the chunks of data are created as at 110 in FIG. 1. For every signature created, the in-memory map is searched at 230, effectively searching the signatures in the previous backup. Once a desired number of blocks, such as $10^5$ blocks in the current backup have been parsed they are removed from the map and memory at 240 and the next $10^5$ signatures from S1 . . . Sn are loaded in memory at 250. This way the map is always limited to a desired size, such as for example $10^6$ entries and the search is fast and efficient. Also when a new signature (calculated in a current backup) is not found in $10^6$ signatures, this new signature may be added into the $10^6$ signatures at 260. This helps find duplicates within the current backup. When the size of the in memory map increases to $10^6+2*10^5$, "oldest" new signatures are discarded from the in memory map at 270. This enables limiting the memory size to a MAX of $10^6+10^5$ entries. Note that the extra $10^5$ entries are allowed to find patterns within the new signatures that have been added to the in memory map. If the last of the signatures has been searched as determined at 280, the process ends at 290. Otherwise, searching continues at 230.

The above method of searching for signatures ensures that the in memory map remains confined to a known fixed size within reasonable limits. The signature search doesn't have to be done on a huge list of signatures. The search is done on only $10^6+10^5$ signatures and this helps expedite the search. The signature search is entirely in memory. Slower disk accesses during the search are minimized other than to load every $10^5$ signatures. Whereas using a conventional Balanced tree would have a higher probability of utilizing many more disk accesses, reducing the search speed and throughput.

The second pass search operates to remove any left duplicities and further reduces the disk storage space needed for a backup.

Figure 3A:
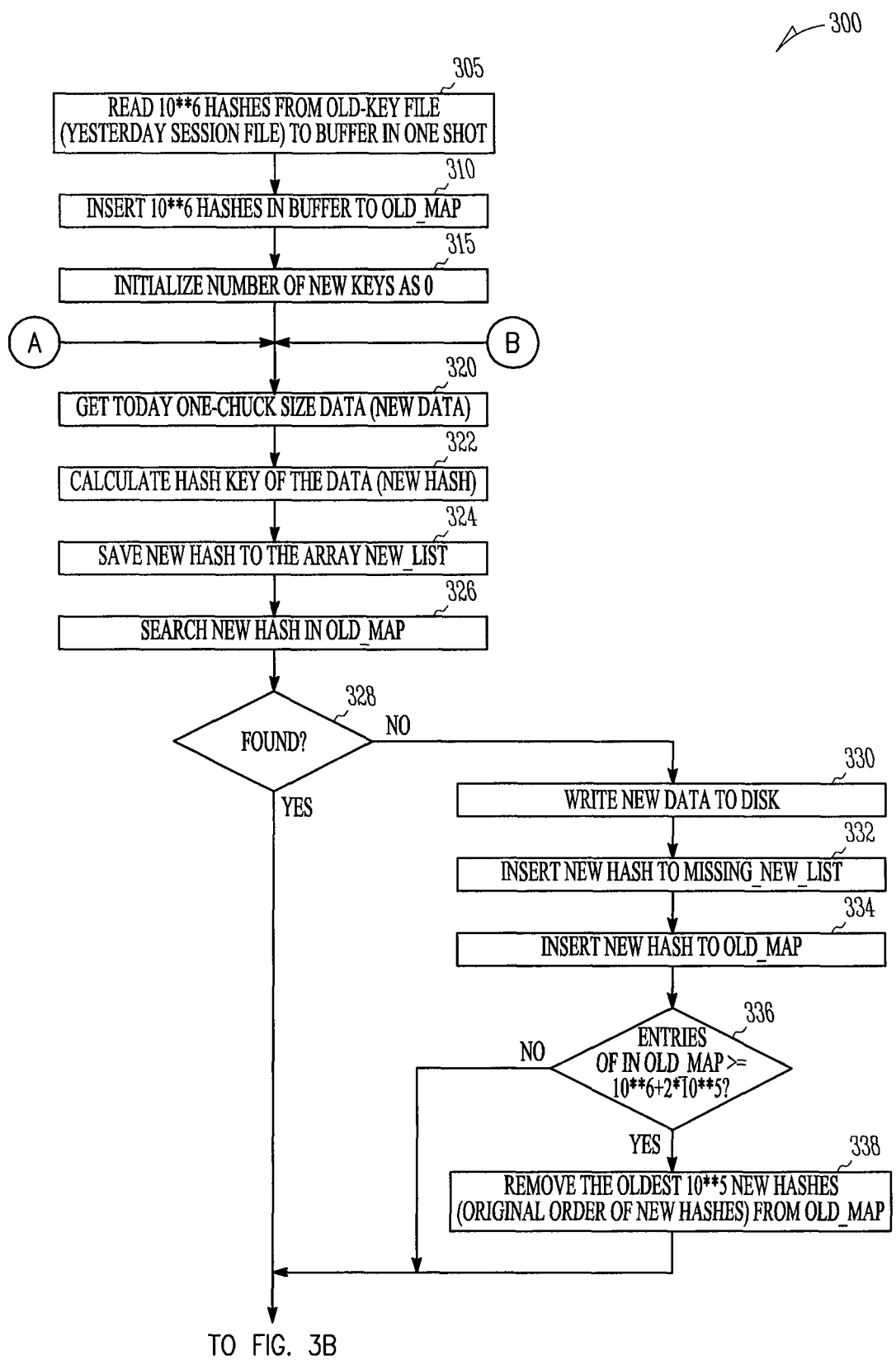
FIGS. 3A and 3B are a detailed flow chart illustrating a computer implemented method of extensively searching for signatures for backing up data according to an example embodiment.
Figure 3B:
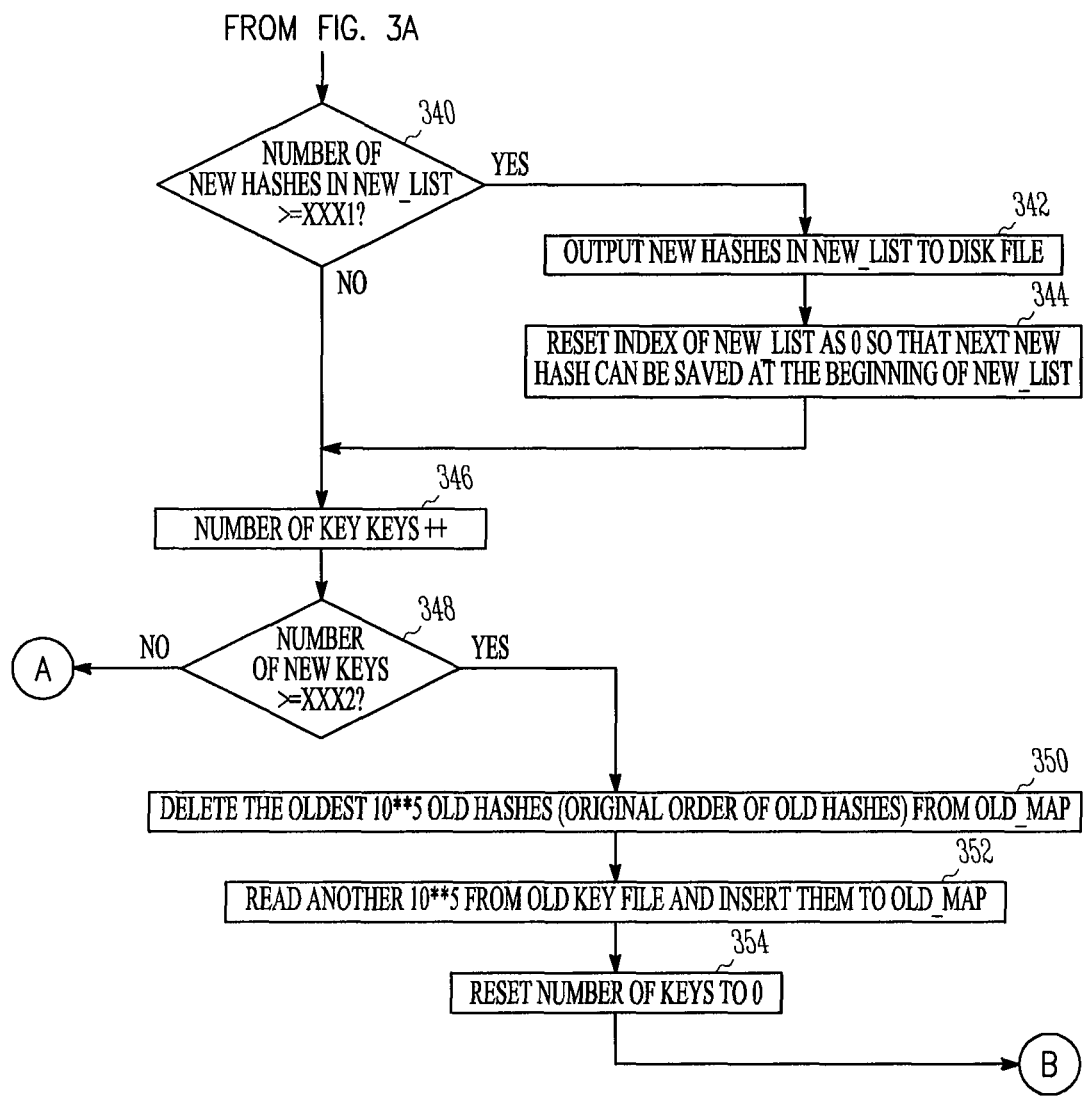
Figure 4A:
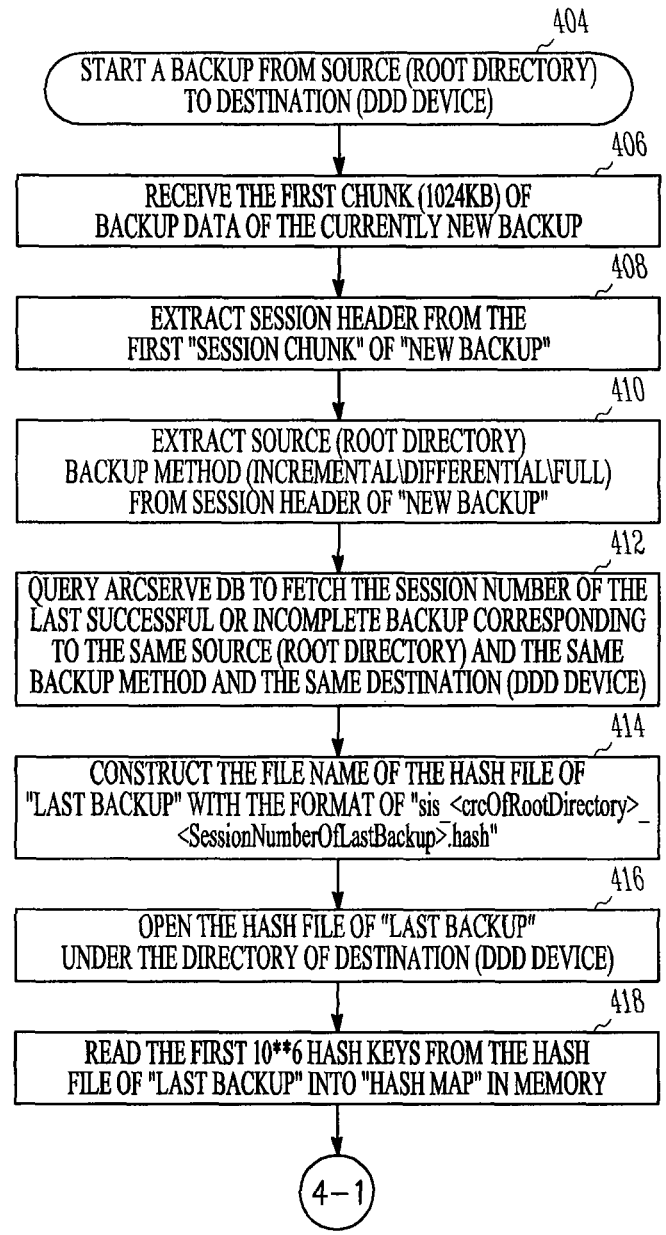
FIGS. 4A, 4B, 4C, 4D and 4E are a detailed flow chart illustrating a computer implemented method of determining duplicate hashes according to an example embodiment.
Figure 4B:
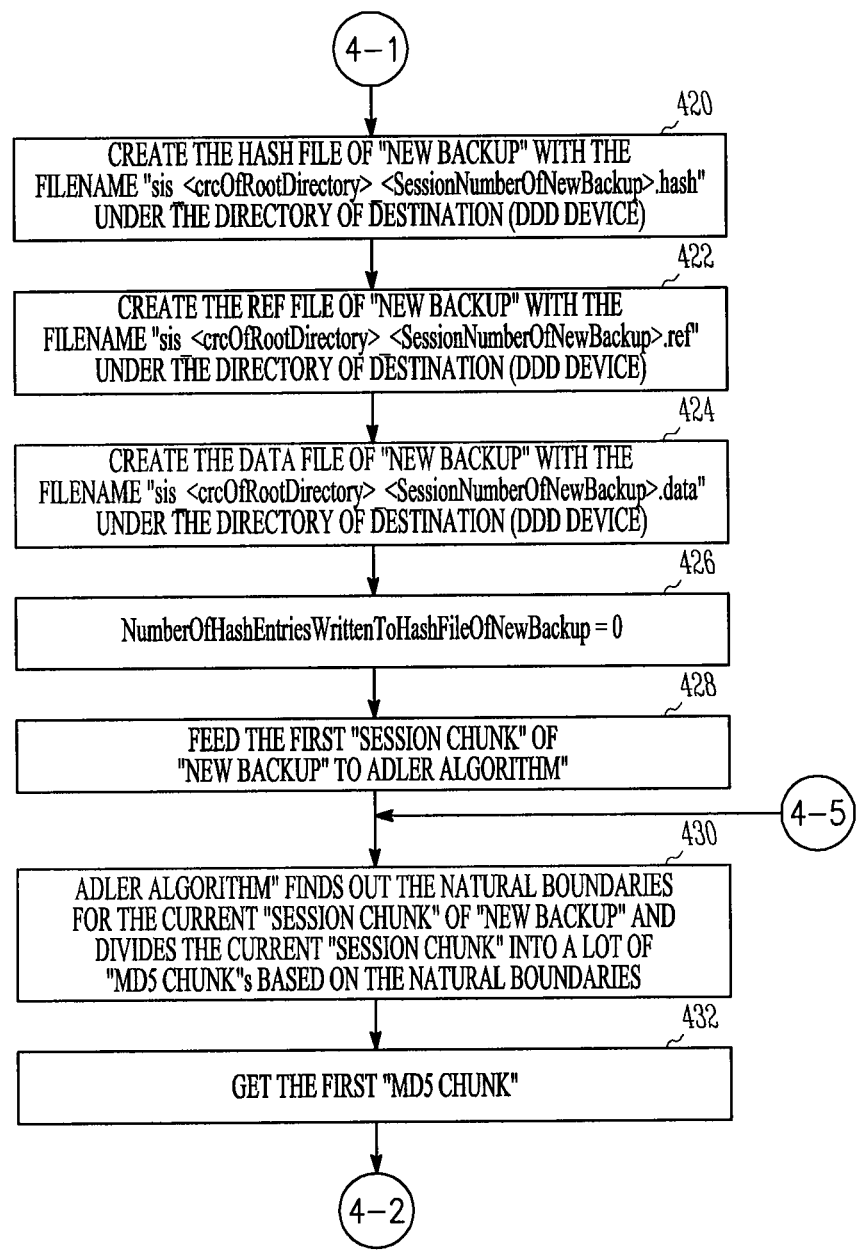
Figure 4C:
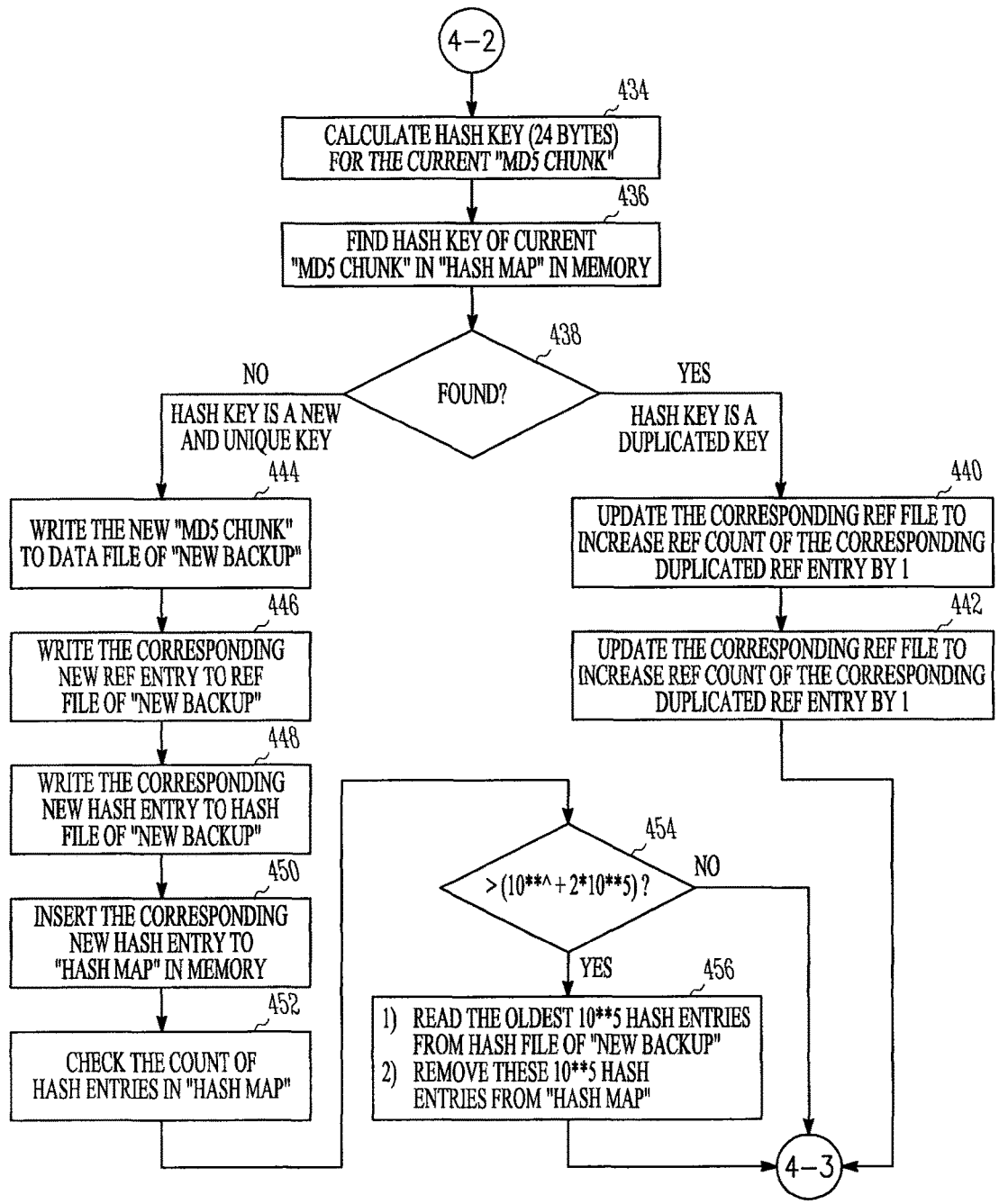
Figure 4D:
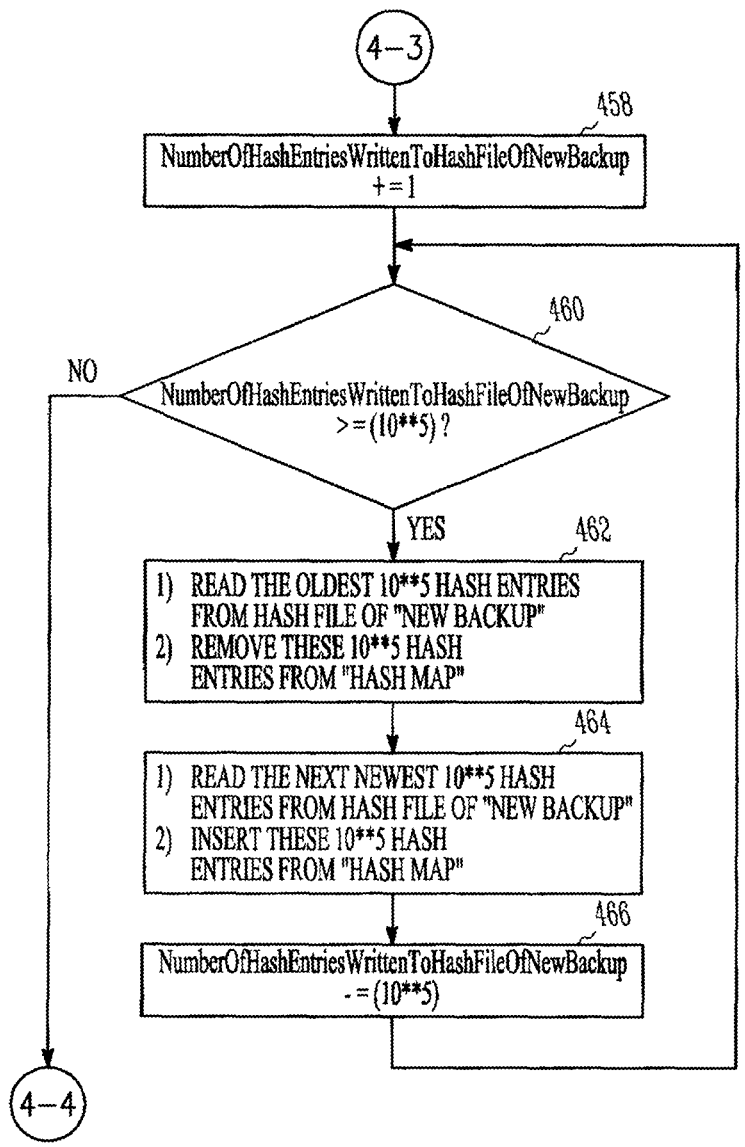
Figure 4E:
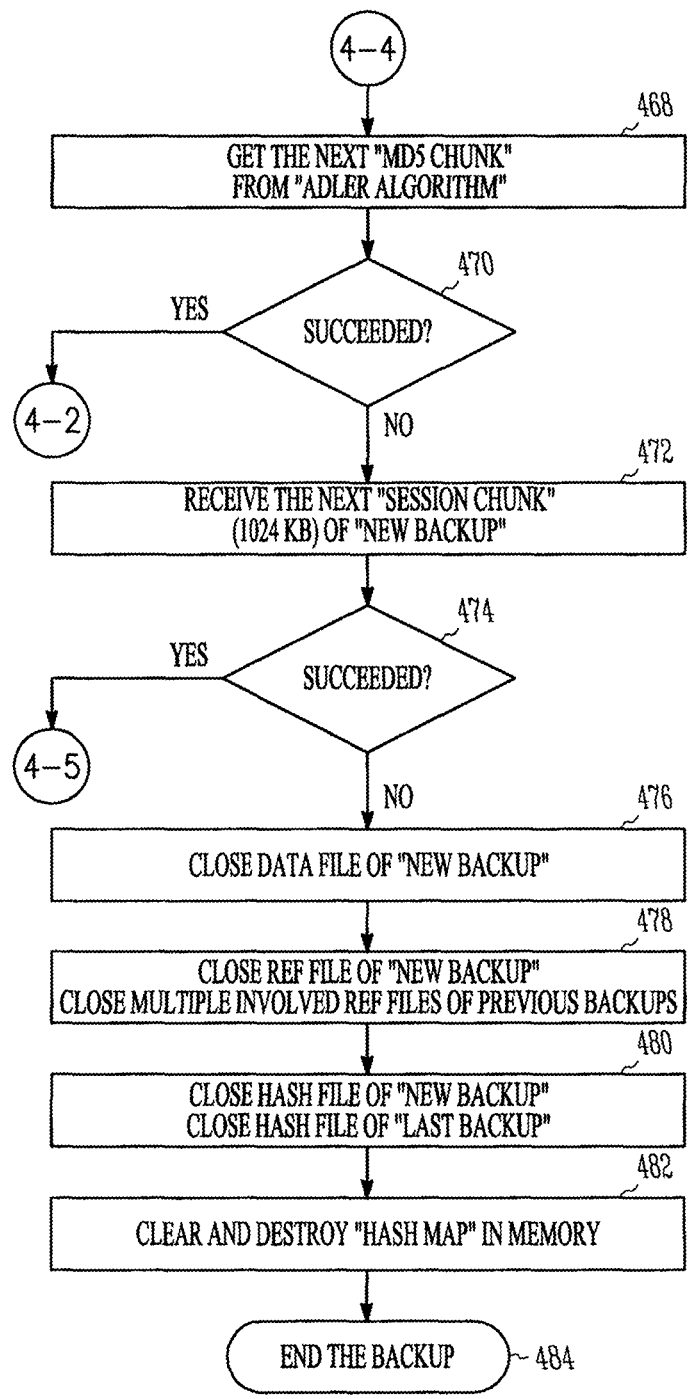

Further detail of a method searching all the old signatures is illustrated in a flowchart 300 in FIGS. 3A and 3B. At 305, hashes (old signatures) are read from previous backup. The old signatures are inserted into a buffer at 310. A variable, NumOfNewKeys is initialized to zero at 315. A chunk of new data is obtained at 320 and a hash is calculated at 322. The new hash is saved to an array called NEW_LIST at 324. The new hash is then searched in the and OLD MAP corresponding to the above buffer at 326. If not found at 328, the corresponding data chunk is written to disk as part of the backup procedure at 330. The corresponding not found signature or hash is written to a MISSING_NEW_LIST at 332. It is also written to OLD_MAP at 334 so that it may be searched as new signatures are generated.

At 336, if the number of entries in the OLD_MAP is too large, the oldest new hashes are removed at 338. Next, at 340, which is also reached if the hash is not found at 328, if the number of new hashes in the NEW_LIST is too large, new hashes in the NEW_LIST may be output to disk at 342, and an index of NEW_LIST is set to zero at 344 so that the new hash can be saved at the beginning of NEW_LIST.

At 346, which is also reached via a NO determination at 340, a NumOfNewKeys is incremented and then compared to a maximum at 348. If not too large, processing continues with new data at 320. If too large, old hashes are deleted from OLD_MAP at 350, and new old hashes are inserted at 352. The NumOfNewKeys is reset to zero at 354, and processing continues with new data at 320.

FIGS. 4A, 4B, 4C, 4D and 4E are a detailed flow chart illustrating a computer implemented method of determining duplicate hashes during a backup according to an example embodiment. At 404, a backup from a source, such as a root directory, to a destination device is started. A term, new backup, is used to represent a current new backup. The term, session chunk, is used to represent on chunk of backup data. The data size of one session chunk in one embodiment is 1024 KB.

At 406, a first chunk of backup data of the current new backup is received. A session header is extracted from a first session chunk of the new backup at 408. Source is extracted at 410, along with a backup method, such as incremental, differential or full, from the session header of the new backup. At 412, a database is queried to fetch a session number of the last successful or incomplete backup corresponding to the same source and the same backup method and the same destination device.

At 414, a file name of a hash file of the last backup is constructed with a desired format. The hash file is opened at 416 under the directory of the destination device, and the first $10^6$ hash keys are read from the hash file of the last backup into a hash map in memory at 418. The term "last backup" is used to represent the last successful or incomplete backup corresponding to the same source and the same backup method and the same destination.

A hash file of a new backup is created at 420 with a selected file name under the directory of the destination device. At 422, a reference file of new backup is created under the directory of the destination device, and at 424 a data file of new backup is also created under the directory of the destination device. At 426, a parameter referred to as NumberOfHashEntriesWrittenToHashFileOfNewBackup is initialized to 0.

At 428, a first session chunk of new backup is fed to an Adler algorithm. At 430, the Adler algorithm finds out the natural boundaries for the current session chunk of new backup and divides the current session chunk into a plurality of MD5 chunks based on the natural boundaries. An D5 chunk represents one chunk separated by the Adler algorithm and is sized between 8 KB and 16 KB in one embodiment. At 432, a first MD5 chunk is obtained.

A hash key of 24 bytes is calculated for the current MD5 chunk at 434 and is searched for in a current hash map in memory at 436. If found at 438, the hash key is a duplicated key, and the corresponding ref file is updated to increase the ref count of the corresponding duplicated ref entry by 1. The corresponding duplicated hash entry is written to the hash file of new backup at 442.

If the hash key is not found at 438, it is a new and unique key in one embodiment. At 44, the new MD5 chunk is written to the data file of new backup, and at 446, the corresponding new ref entry is written to the ref file of new backup. At 448, the corresponding new hash entry is written to the hash file of new backup. At 450, the corresponding new hash entry is inserted into the hash map in memory. At 452, the count of hash entries in the hash map is checked, and if greater than $10^6+2*10^5$ at 454, the oldest $10^5$ hash entries from the hash file of new backup are read, and removed from the hash map at 456.

The method then continues in either case at 458, where the NumberOfHashEntriesWrittenToHashFileOfNewBackup is incremented by 1. It is then compared at 460 to determine whether it is greater than or equal to $10^5$. If it is, at 462, the oldest $10^5$ hash entries from the hash file of new backup are read, and removed from the hash map. At 464, the newest $10^5$ hash entries from the hash file of last backup are read, and inserted into the hash map. At 466, NumberOfflashEntriesWrittenToHashFileOfNewBackup is decremented by 1.

In either event, the method continues at 468, were the next MD5 chunk is obtained from the Adler algorithm. If the next chunk is obtained at 470, the method returns to 434 to calculate the hash key for the current chunk. If the chunk is not obtained at 470, the next session chunk of the new backup is obtained at 472. Success at this point as indicated at 474 directs the method back to 430 to find the natural boundaries. If not successful at 474, the data file of new backup is closed at 476, the ref file of new backup and multiple involved ref files of previous backups are closed at 478. The hash files of both new backup and last backup are closed at 480, the hash map in memory is cleared and destroyed at 482, and the backup is ended at 484.

Figure 5:
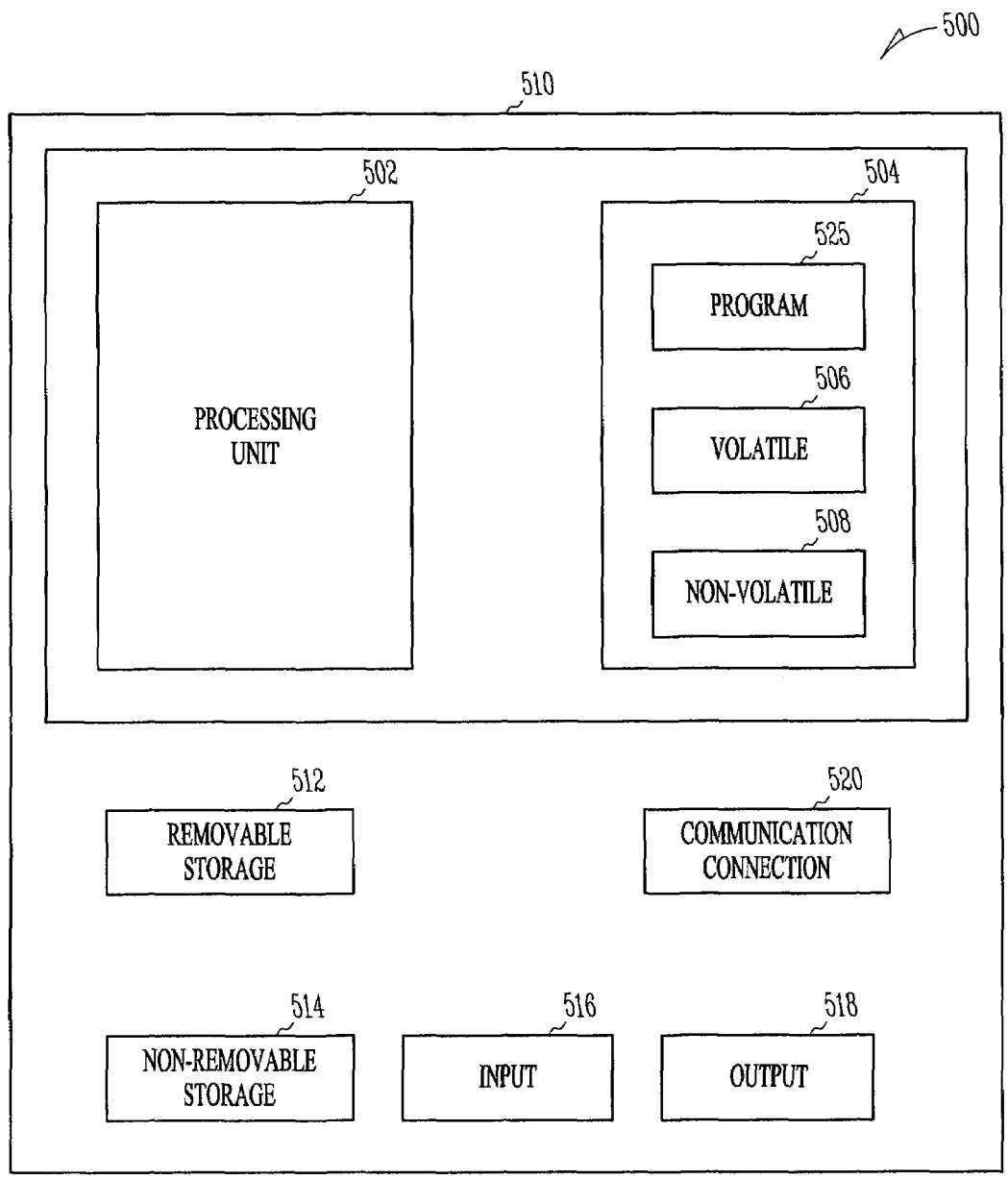
FIG. 5 is a block diagram of a typical computer system for implementing methods of searching for signatures for backing up data according to an example embodiment.

A block diagram of a computer system that executes programming for performing the above algorithm is shown in FIG. 5. A general computing device in the form of a computer 510, may include a processing unit 502, memory 504, removable storage 512, and non-removable storage 514. Memory 504 may include volatile memory 506 and non-volatile memory 508. Computer 510 may include—or have access to a computing environment that includes—a variety of computer-readable media, such as volatile memory 506 and non-volatile memory 508, removable storage 512 and non-removable storage 514. The processing unit along with programming form a signature generator that can generate the signatures of data described above, and also provide a search engine that can perform the proximity and extensive searches described above.

Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. Computer 510 may include or have access to a computing environment that includes input 516, output 518, and a communication connection 520. The computer may operate in a networked environment using a communication connection to connect to one or more remote computers. The remote computer may include a personal computer (PC), server, router, network PC, a peer device or other common network node, or the like. The communication connection may include a Local Area Network (LAN), a Wide Area Network (WAN) or other networks.

Computer-readable instructions stored on a computer-readable medium are executable by the processing unit 502 of the computer 510. A hard drive, CD-ROM, and RAM are some examples of articles including a computer-readable medium.

The Abstract is provided to comply with 37 C.F.R. §1.72(b) to allow the reader to quickly ascertain the nature and gist of the technical disclosure. The Abstract is submitted with the understanding that it will not be used to interpret or limit the scope or meaning of the claims.

The following statements are potential claims that may be converted to claims in a future application. No modification of the following statements should be allowed to affect the interpretation of claims which may be drafted when this provisional application is converted into a regular utility application.

The invention claimed is:

1. A method comprising:
   identifying a first plurality of signatures of data chunks in a first data backup of a plurality of data backups, wherein identifying the first plurality of signatures is based, at least in part, on the first data backup being a most recent of the plurality of data backups;
   performing a first search of the first plurality of signatures for each of a second plurality of signatures of data chunks for a second data backup,
      wherein the plurality of data backups precedes the second data backup,
      for each of the second plurality of signatures found in the first plurality of signatures, indicating that a corresponding data chunk is not to be stored for the second data backup; and
   after the first search, performing a second search of at least a third plurality of signatures of older data backups of the plurality of data backups, wherein performing the second search comprises,
      creating and updating an in-memory map with progressively older subsets of signatures of the third plurality of signatures that are incrementally loaded from a backup domain into memory, for each progressively older subset of signatures in the in-memory map, searching the in-memory map for the second plurality of signatures, and for each of the second plurality of signatures found in the in-memory map, removing a duplicate of a corresponding data chunk from either the second data backup or the older data backups.

2. The method of claim 1 wherein the second data backup corresponds to a volume on a machine.

3. The method of claim 1, wherein indicating, for each of the second plurality of signatures found in the in-memory map, that the corresponding data chunk is not to be stored for the second backup comprises removing the signature found in the in-memory map from a list of the second plurality of signatures.

4. The method of claim 1, wherein creating and updating the in-memory map comprises:
after each searching of the in-memory map, removing a currently loaded one of the progressively older subsets of signatures from the in-memory map and inserting into the in-memory map a next most recent one of the progressively older subsets of signatures.

5. The method of claim 1 further comprising:
in response to not finding a signature of the second plurality of signatures in the in-memory map, inserting into the in-memory map the signature that was not found; and
in response to determining that a number of entries of the in-memory map reaches a threshold based on inserting the signature that was not found, removing the oldest signature from the in-memory map.

6. The method of claim 1, wherein identifying the first plurality of signatures comprises:
determining a source, destination, and backup method for the second data backup;
identifying the first data backup as the last successful or incomplete backup from the source to the destination with the backup method; and
accessing a file for the first data backup that includes the first plurality of signatures.

7. The method of claim 1, wherein performing the second search is after completion of the second data backup.

8. The method of claim 1 wherein the in-memory map is a btree.

9. A method comprising:
identifying a first plurality of signatures of data chunks of a first data backup of a plurality of data backups;
loading a first subset of the first plurality of signatures from a backup domain into memory;
creating an in-memory map with the first subset of signatures;
searching the in-memory map for each of a second plurality of signatures of data chunks of a second data backup, wherein the first data backup precedes the second data backup and the first subset of signatures comprises most recent signatures of the first plurality of signatures;
incrementally loading progressively older subsets of the first plurality of signatures from a backup domain into the memory;
after each loading,
removing at least one of the signatures from the in-memory map in order from oldest to youngest, wherein a number of the signatures removed from the in-memory map is based on a size boundary defined for the in-memory map;
inserting currently loaded signatures from the memory into the in-memory map;
for each of the second plurality of signatures found in the in-memory map, indicating that a corresponding data chunk is not to be stored for the second data backup;
in response to not finding a signature of the second plurality of signatures in the in-memory map, inserting into the in-memory map the signature that was not found; and
in response to determining that a number of entries of the in-memory map satisfies a threshold based on inserting the signature that was not found, removing the oldest of the signatures in the in-memory map.

10. The method of claim 9 wherein the second data backup corresponds to a volume on a machine.

11. The method of claim 9 wherein indicating, for each of the second plurality of signatures found in the in-memory map, that the corresponding data chunk is not to be stored for the second data backup comprises removing the signature found in the in-memory map from a list of the second plurality of signatures.

12. The method of claim 9 wherein the in-memory map is a btree.

13. A non-transitory computer readable storage medium comprising instructions for narrow duplicate searching of previous data backups, the instructions to:
identify a first plurality of signatures of data chunks in a first data backup of a plurality of previous data backups, wherein identifying the first plurality of signatures is based, at least in part, on the first data backup being a most recent of the plurality of previous data backups;
perform a first search of the first plurality of signatures for each of a second plurality of signatures of data chunks for a second data backup,
wherein the first data backup precedes the second data backup and is a most recent of the plurality of previous data backups,
for each of the second plurality of signatures found in the first plurality of signatures, indicate that a corresponding data chunk is not to be stored for the second data backup; and
perform a second search of at least a third plurality of signatures of a third backup of the plurality of previous data backups that precedes the first backup,
wherein the instructions to perform the second search comprise instructions to load a first subset of signatures of the third plurality of signatures from a backup domain into memory to create an in-memory map,
search the in-memory map for the second plurality of signatures, and
for each of the second plurality of signatures found in the in-memory map, indicate that a corresponding data chunk is not to be stored for the second data backup.

14. The non-transitory computer readable storage medium of claim 13 further comprising instructions to:
load the subset of signatures from a backup domain into memory prior to searching.

15. The non-transitory computer readable storage medium of claim 13, wherein the instructions to identify the first plurality of signatures comprise instructions to:
determine a source, a destination, and a backup method for the second data backup;
identify the first data backup as the last successful or incomplete backup from the source to the destination with the backup method; and access a file for the first data backup that includes the first plurality of signatures.

16. The non-transitory computer readable storage medium of claim 13, wherein the instructions to perform the second search comprise instructions to:
perform the second search after completion of the second data backup.

17. A system comprising:
a processor; and
a computer-readable medium comprising instructions executable by the processor to cause the system to,
identify a first plurality of signatures of data chunks in a first data backup of a plurality of data backups, wherein identifying the first plurality of signatures is based, at least in part, on the first data backup being a most recent of the plurality of data backups;
perform a first search of the first plurality of signatures for each of a second plurality of signatures of data chunks for a second data backup,
wherein the plurality of data backups precedes the second data backup,
for each of the second plurality of signatures found in the first plurality of signatures, indicate that a corresponding data chunk is not to be stored for the second data backup; and
after the first search, perform a second search of at least a third plurality of signatures of older data backups of the plurality of data backups, wherein the instructions to perform a second search comprises instructions to
create and update an in-memory map with progressively older subsets of signatures of the third plurality of signatures that are incrementally loaded from a backup domain into memory,
for each progressively older subset of signatures in the in-memory map, search the in-memory map for the second plurality of signatures, and
for each of the second plurality of signatures found in the in-memory map, indicate that a corresponding data chunk is not to be stored for the second data backup.

18. The system of claim 17, wherein the instructions further comprise instructions executable by the processor to cause the system to:
load the most recent subset of signatures from a backup domain into a map in memory of the system, wherein the instructions to search comprise instructions to search the most recent subset of signatures loaded into the in-memory map;
in response to not finding a signature of the second plurality of signatures in the in-memory map, insert into the in-memory map the signature that was not found; and
in response to a determination that a number of entries of the map reaches a threshold, remove the oldest of the second plurality of signatures that were inserted into the in-memory map up to a specified number.

19. The system of claim 17, wherein the instructions to identify the first plurality of signatures comprise instructions to:
determine a source, a destination, and a backup method for the second data backup;
identify the first data backup as the last successful or incomplete backup from the source to the destination with the backup method; and
access a file for the first data backup that includes the first plurality of signatures.

20. The system of claim 17, wherein the instructions further comprise instructions executable by the processor to cause the system to:
perform the second search after completion of the second data backup.

* * * * *